(12) United States Patent
Siggelkow et al.

(10) Patent No.: US 8,185,772 B2
(45) Date of Patent: May 22, 2012

(54) DETERMINING EXECUTION TIMES OF COMMANDS

(75) Inventors: Andreas Siggelkow, Erding (DE);
Thomas Zettler,
Hoehenkirchen-Siegertsbrunn (DE)

(73) Assignee: Infineon Technologies AG, Neubiberg (DE)

( * ) Notice: Subject to any disclaimer, the term of this patent is extended or adjusted under 35 U.S.C. 154(b) by 841 days.

(21) Appl. No.: 11/849,517

(22) Filed: Sep. 4, 2007

(65) Prior Publication Data

US 2008/0059828 A1   Mar. 6, 2008

(30) Foreign Application Priority Data

Sep. 4, 2006   (DE) .................. 10 2006 041 444

(51) Int. Cl.
*G06F 1/04*   (2006.01)
*G06F 1/14*   (2006.01)
(52) U.S. Cl. ........ 713/502; 713/500; 713/501; 717/124; 717/127; 717/131
(58) Field of Classification Search .................. 713/500, 713/501, 502; 717/124, 131, 12
See application file for complete search history.

(56) References Cited

U.S. PATENT DOCUMENTS

| 6,609,216 B1 * | 8/2003 | Almy et al. ..................... 714/25 |
| 6,691,080 B1 | 2/2004 | Tachibana | |
| 7,353,517 B2 * | 4/2008 | Accapadi et al. ............. 718/102 |
| 7,360,218 B2 * | 4/2008 | Accapadi et al. ............. 718/102 |
| 7,447,883 B2 * | 11/2008 | Vasekin et al. ................ 712/238 |
| 7,596,719 B2 * | 9/2009 | Pedersen ......................... 714/31 |
| 7,707,554 B1 * | 4/2010 | Kosche et al. ................ 717/127 |
| 7,735,073 B1 * | 6/2010 | Kosche et al. ................ 717/158 |
| 7,779,270 B2 * | 8/2010 | Horning et al. ............... 713/187 |
| 2004/0030853 A1 | 2/2004 | Welker et al. | |
| 2004/0163079 A1 * | 8/2004 | Noy et al. ....................... 717/154 |
| 2004/0268316 A1 * | 12/2004 | Fisher et al. ................... 717/130 |
| 2005/0081183 A1 * | 4/2005 | Accapadi et al. ............. 717/100 |
| 2005/0155026 A1 * | 7/2005 | DeWitt et al. ................. 717/158 |
| 2006/0036810 A1 * | 2/2006 | Accapadi et al. ............. 711/132 |
| 2007/0061108 A1 * | 3/2007 | DeWitt et al. ................. 702/183 |
| 2007/0220333 A1 * | 9/2007 | Pedersen ......................... 714/30 |
| 2007/0234070 A1 * | 10/2007 | Horning et al. ............... 713/190 |
| 2008/0040592 A1 * | 2/2008 | Vasekin et al. ................ 712/238 |

FOREIGN PATENT DOCUMENTS

| EP | 0689141 | 12/1995 |
| EP | 0919919 | 6/2004 |
| JP | 07160545 | 12/1993 |

* cited by examiner

*Primary Examiner* — Thomas Lee
*Assistant Examiner* — Jaweed A Abbaszadeh
(74) *Attorney, Agent, or Firm* — Banner & Witcoff, Ltd.

(57) ABSTRACT

Methods and apparatuses for determining a number of clock cycles during an execution of a command by a processor, determining a value associated with the number of clock cycles, storing an indicator indicative of the command, responsive to the value indicative of the execution time exceeding a threshold value.

26 Claims, 3 Drawing Sheets

DETERMINING EXECUTION TIMES OF COMMANDS

CROSS-REFERENCE TO RELATED APPLICATIONS

This application claims priority to German patent application No. 10 2006 041 444.6, filed Sep. 4, 2006, hereby incorporated by reference as to its entirety.

BACKGROUND

Software can be divided into real-time-critical (real time software) and real-time-non-critical applications. For real-time-critical software for example, due to standards or the quality requirements of a user, a particular command or a particular task should be processed within a specified time. High latency times in command execution present a potential problem for real-time software, since long latency times (i.e., real-time violations) may lead, e.g., to a system crash.

One illustrative source for real-time violations are memory accesses, because the discrepancy between the ever shorter processing time of instructions in the processor and the access time to memory units has been steadily increasing due to the high power of modern processors. A way to reduce memory access time is the use of so-called cache memories, where part of the data required can be stored in a small fast memory arranged in the vicinity of the processor. The data stored in the cache memory are selected by taking into account the specific application such that as much of the data as possible expected to be required at a given moment are already present in the cache memory. However, current data selection techniques are imperfect and do not always result in the appropriate data being present in the cache memory at the right time. If required data is not present in the cache memory (referred to as a cache miss case), access to a secondary memory has been required, which typically entails a longer access time. Thus high latency times are often connected with such secondary memory access. However, high latency times, which can lead to a violation of real-time conditions, can also have other causes such as latency caused by bus conflicts and register access.

To optimize software such that high latency times, and hence the associated system crashes, can be avoided or reduced, software is normally tested and debugged. The execution of a sequence of commands by the processor is monitored to detect potential problems. However, such testing and debugging does not benefit from a way to determine execution times associated with the execution of commands.

SUMMARY

Various illustrative methods and apparatuses are described for determining a number of clock cycles during an execution of a command by a processor, determining a value associated with the number of clock cycles, storing an indicator indicative of the command, responsive to the value indicative of the execution time exceeding a threshold value.

These and other aspects of the disclosure will be apparent upon consideration of the following detailed description of illustrative aspects.

BRIEF DESCRIPTION OF THE DRAWINGS

A more complete understanding of the present disclosure may be acquired by referring to the following description in consideration of the accompanying drawings, in which like reference numbers indicate like features, and wherein.

DETAILED DESCRIPTION

In the following, illustrative embodiments will be described in detail. It is to be understood that the following description is given only for the purpose of illustrating various principles and is not to be taken in a limiting sense.

It is also to be understood that, in the following description of illustrative embodiments, any direct connection or coupling between two functional blocks, devices, components, or other physical or functional units shown in the drawings or described herein could also be implemented by an indirect connection or coupling. Further, it will be appreciated that any component or device may be implemented in hardware, in software, in firmware, or in a combination thereof.

Further, it is to be understood that the features of the various illustrative embodiments described hereinafter may be combined with each other, unless specifically noted otherwise.

In some illustrative embodiments, a circuit arrangement for determining an execution time of a command executed by a computing device includes a time determination circuit configured to determine a value indicative of the execution time and a memory which is configured to store an indicator indicative of the command based on a comparison of the value indicative of the execution time and the threshold value. The value indicative of the execution time may be, for instance, a number of clock cycles elapsing while the command is being executed. The indicator indicative of the command may be, for example, a value of a command counter.

Figure 1:
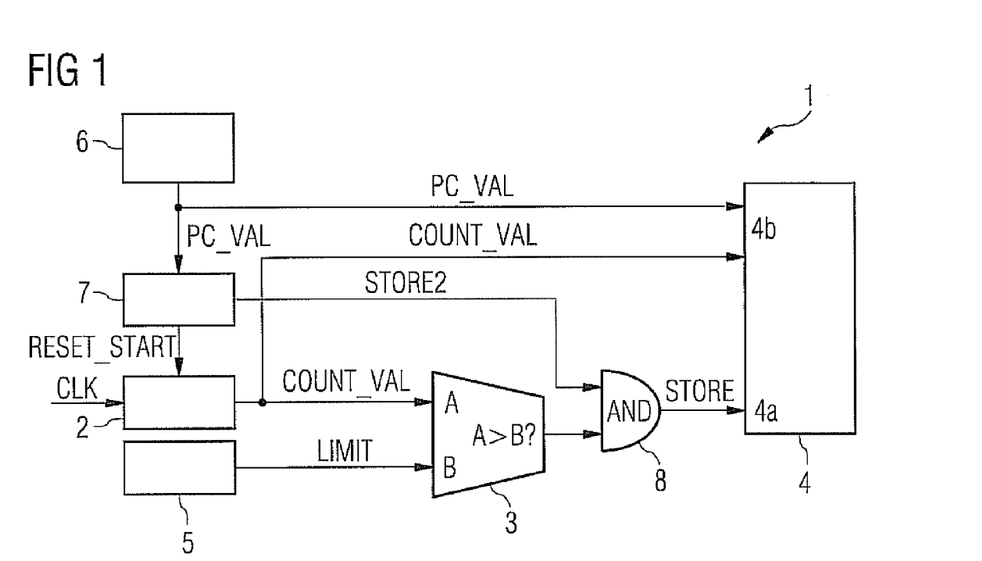
FIG. 1 is a schematic diagram of an illustrative embodiment of a circuit arrangement for determining an execution time of a command.

With reference to FIG. 1, an illustrative embodiment of a circuit arrangement 1 for determining an execution time of a command will be explained in more detail. The circuit arrangement in this example includes a time determination circuit in the form of a counter 2 to count clock cycles/pulses CLK, a comparator 3 to compare the number of clock cycles with a threshold value, and a memory 4 to store a number of clock cycles determined by the counter 2 or another value indicative of the execution time of the command and an indicator indicative of the command just performed. As will be explained in more detail below, in the circuit arrangement 1 of FIG. 1, the number of clock cycles, which may relate to the execution time of the command, is stored in the memory 4 if the number of clock cycles exceeds a predetermined threshold value. The threshold value is stored in the threshold value register 5. The comparator 3 compares the value COUNT_VAL of the counter 2 with the threshold value LIMIT present at inputs A and B, respectively, of comparator 3, and the output of comparator 3 is true if the counter value is greater than the threshold value.

To determine the value indicative of the execution time, the time determination circuit may be supplied externally, for example from the processor core, with signals indicating the start and/or end of execution of the command. For example, such signals could be supplied to the counter 2 to start and/or reset the counter.

In the circuit arrangement 1, signals indicating the start and/or end of the execution of the command are obtained by monitoring a circuit state signal, such as a processor signal. In the present illustrative embodiment, the circuit state detector is configured as a processor signal detector 7. The processor signal detector 7 monitors a processor signal and is configured as a change detector. One illustrative implementation of the processor signal detector 7 will be explained in more detail with reference to FIG. 5. The processor signal detector 7 has the function, based on monitoring of the processor signal, of generating a start and stop signal, respectively, which indicates the start and end of a command execution. As used in connection with this embodiment, the term "processor signal" generally refers to any signal which may be generated in the processor core itself, or any signal which may be coupled into or out of the processor core. In the circuit arrangement shown in FIG. 1, the processor signal is a value PC_VAL of a command counter of the processor core and is output from the processor counter 6 of the processor core to the processor signal detector 7. It should be noted that the command counter 6 is included in FIG. 1 only for reasons of clarity, but does not need to be an actual component of the circuit arrangement. A change in command counter value PC_VAL indicates that a command has been processed and the processor starts to execute a new command. Accordingly the processor signal detector 7 has two outputs, one of which carries the signal RESET_START and is coupled with counter 2, while the other carries a signal STORE2 and is coupled with an AND gate 8. If the processor signal detector 7 detects a change in the command counter value PC_VAL, both the signal STORE2 and, with a time delay, the signal RESET_START become true. Both the signal STORE2 and the output of comparator 3 are transmitted to inputs of the AND gate 8 so that the signal STORE at the output of the AND gate 8 is true if, on a change in command counter value that is indicated by STORE2 becoming true, the value of the counter 2 exceeds the threshold value stored in the threshold memory 5.

While in the illustrative embodiment of FIG. 1, the processor signal detector forms a circuit state detector that monitors a value of a command counter, the circuit state signal detector may be configured to monitor any circuit state signal in order to provide a signal indicating the start and/or end of the execution of the command. The circuit state signal which is monitored by the circuit state detector can be any suitable circuit state signal, the change of which indicates the start and/or end of execution of any command or a particular class of commands. For example, in some embodiments, the circuit state signal can be selected from the group including a command counter value, a cache miss signal, a stall signal which indicates that the processor is waiting for availability of data or program code, and a signal indicating memory access (cache fetch). In multistage caches, the circuit state signal may be the logical combination of several cache miss signals. For example, in one illustrative embodiment, with two-stage caches, the logical AND of the cache miss signals can be used as the start signal. The circuit state signal that is monitored may be selected based on which commands or classes of commands are to be monitored in view of their execution times. If, for example, latency times associated with each command execution are to be determined, in one embodiment, a change in the command counter value may serve both as the signal indicating an end of a command execution and as a signal indicating the start of execution of the next command. If only those commands are to be detected in which a datum is not found in the cache, in some embodiments the cache miss signal may be monitored to generate a start signal for the time determination circuit, and a signal indicating the end of the cache fetch operation may be monitored to generate the stop signal for the time determination circuit.

Referring again to FIG. 1, the output of the AND gate 8 is coupled with an input 4a of the memory 4 so that if the signal STORE becomes true, a value PC_VAL of the command counter and a value COUNT_VAL of the counter 2 at the data input 4b are stored in the memory 4.

The signal RESET_START at the second output of the processor signal detector 7, which is connected with an input of the counter 2, also becomes true if the value PC_VAL of the command counter changes. In this case the value of counter 2 is reset to 0 and the counter starts to count again the clock pulses CLK of the processor. A time delay between the transitions of the signals STORE2 and RESET_START to true may allow the value of the counter 2 to be read before it is reset to 0.

In the circuit arrangement of FIG. 1, data relating to the execution time of a command, such as the number of clock cycles which elapse during a command execution, and the associated value of the command counter for the corresponding command, may be stored only if the number of clock cycles, i.e. the value of counter 2, exceeds the threshold value stored in threshold value register 5.

Because the memory 4 has stored therein not only the number of clock cycles during execution of the command, which may be a measure of the execution time, but also the value of the command counter, an analysis may be performed based on the data stored in the memory 4 to determine which commands of a sequence of commands cause high latency or utilize a large amount of execution time.

In some embodiments, the threshold value stored in threshold value register 5 may be suitably selected so that first the commands which have particularly long execution times can be identified in a sequence of commands. With increasing software optimization, i.e. with reduction or elimination of commands with very long execution times, the threshold value can be lowered accordingly to optimize the software further. In some embodiments, a typical starting value for the threshold value may be, for example, in the range of three to five clock cycles, so that the number of clock cycles and value of the command counter are stored only when the execution of the command exceeds a length of a threshold that is in the range of three to five clock cycles. Alternatively, the starting value may be higher than five clock cycles. During optimization, the threshold value can be lowered to below the starting value, such as to two clock cycles or even to one clock cycle. Because many commands in modern processors can be processed in one clock cycle, the quantity of data to be stored may be reduced.

Since situations may occur in which the storage capacity of memory 4 may be exceeded if, e.g., long sequences of commands are executed or when the software is insufficiently optimized, the memory 4 may be configured as a first-in-first-out (FIFO) memory so that if the memory capacity is exceeded, the oldest data is overwritten first.

In some embodiments, the circuit arrangement shown in FIG. 1 can be configured as an integral part of an integrated circuit including a processor. In further embodiments, the circuit arrangement may form an on-chip debugging device. In further embodiments, the circuit arrangement may be configured so that it may be activated and deactivated so that a special debug mode can be executed.

To allow a user to access the data stored in memory 4 for further software optimization even after a system crash, the integrated circuit which includes the circuit arrangement 1 may for example have a debug interface which allows reading of the memory 4 even after a system crash without a processor re-start. If the integrated circuit has further on-chip debug devices, one part or several parts of the circuit arrangement 1 can be configured as a component that may be shared with other debug devices. For example the memory 4 can be a debug memory which is used simultaneously by several debug devices.

In the illustrative embodiment of FIG. 1, the number of clock cycles is stored in the memory 4 as a measure of the execution time of a command, i.e., as a value indicative of the execution time. The number of clock cycles during the execution of the command may represent a measure for the execution time not only with constant clock cycle time but also with slightly varying clock cycle time (period) or clock frequency of the processor.

In some embodiments, a measure for the execution time of a command, i.e., a value indicative of the execution time, is obtained by taking into account variations in the clock cycle time in determining the value indicative of the execution time. To this end, in some embodiments, the counter 2 in FIG. 1 may be replaced by other circuits which form time determination circuits.

In some embodiments, the value indicative of the execution time can for example include the actual execution time of the command in suitable time units. The time determination circuit may be configured, for example, to detect a clock frequency or clock cycle time of the processor in order to determine the execution time based on the clock frequency or clock period and a number of clock cycles elapsing while the command is being executed. The time determination circuit may include a multiplier to multiply the clock period with the number of clock cycles. In one illustrative embodiment, the time determination circuit may further include an adder to determine an accumulated value of products calculated by multiplying the clock period with the number of clock cycles.

Figure 2:
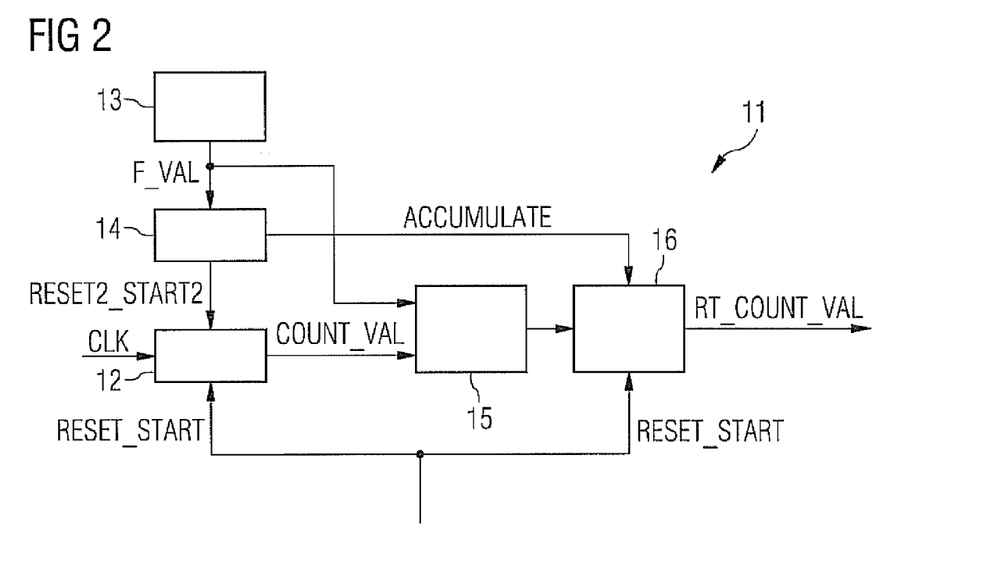
FIG. 2 is a schematic diagram of an illustrative embodiment of a circuit arrangement for a modified implementation of a time determination circuit that may be used in the circuit arrangement according to FIG. 1.
Figure 3:
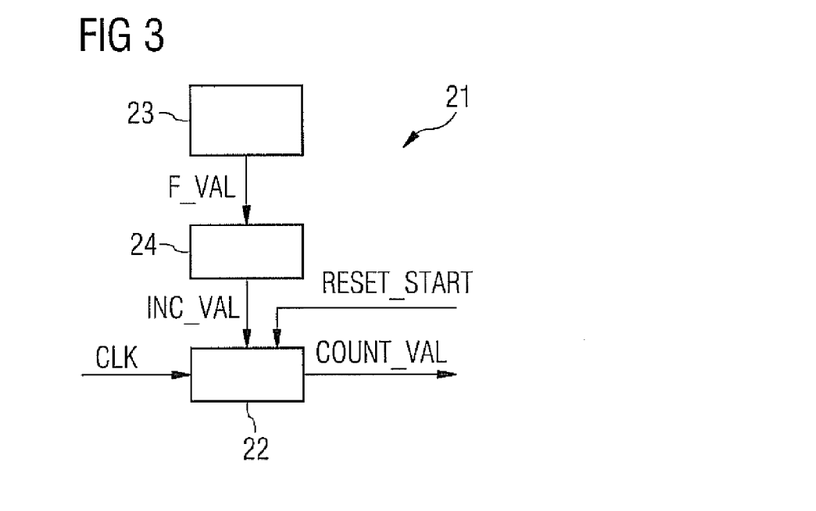
FIG. 3 is a schematic diagram of an illustrative embodiment of a circuit arrangement for a further modified implementation of the time determination circuit that may be used in the circuit arrangement of FIG. 1.

Referring now to FIGS. 2 and 3, other illustrative implementations for the time determination circuit are shown which may be utilized as an alternative to the counter 2 in the circuit arrangement of FIG. 1. In the illustrative embodiments in which the time determination circuit is implemented as indicated in FIGS. 2 and 3, changes in the clock cycle time or clock frequency may be accounted for in determining the value indicative of the execution time.

FIG. 2 shows one illustrative implementation of the time determination circuit 11 which includes a counter 12 for counting clock pulses CLK of the processor, a frequency detector 14, a multiplier 15 and an adder 16. The frequency detector 14 is configured as a change detector and is adapted to detect a change in clock frequency or clock cycle time of the processor. To this end, the frequency detector 14 is coupled with a register 13, the value of which corresponds to the clock cycle time or clock frequency of the processor. The register 13 is depicted schematically in FIG. 2, but does not need to form a part of the time determination circuit. The value for the clock cycle time or clock frequency is designated below as F_VAL. The frequency detector 14 has two outputs which are coupled with the counter 12 and adder 16, respectively, wherein the signals at the outputs are designated RESET2_START2 and ACCUMULATE, respectively. If the frequency detector 14 detects a change in the value of the clock frequency or clock cycle time stored in the register 13, both the signal ACCUMULATE the signal RESET2_START2 become true. In some embodiments, the signal RESET2_START2 becomes true with a time delay relative to the signal ACCUMULATE. The input of the time determination circuit 11, which is coupled with the output of the processor signal detector 7 at which the signal RESET_START is output, is connected with both the counter 12 and the adder 16 so that when the signal RESET_START assumes the value true, both the value of the counter 12 and the value of the adder 16 are reset to 0. In addition the value of the counter 12 is also reset to 0 if the signal RESET2_START2 assumes the value true, i.e. if the clock frequency or clock cycle time of the processor changes.

For illustration only, it will be assumed for the following explanations that the clock cycle time of the processor can only assume values which can be written as rational multiples of a minimum period Tmin, i.e. that the clock cycle time is $T=m/n \times Tmin$, where m and n are integers. The value F_VAL for the clock cycle time in this case is m/n. The multiplier 15 is configured as a fractional multiplier, at the inputs of which the value F_VAL for the quotient m/n and the value COUNT_VAL from the counter 12, respectively, are input, and which calculates the product COUNT_VAL×m/n. As the value of counter 12 is reset to 0 when either one of the value of the command counter or the value of the clock frequency or clock cycle time changes, the value COUNT_VAL of command counter 12 corresponds to the number of clock cycles since the last change in command counter value or clock frequency of the processor, whichever value changed last. Thus the value COUNT_VAL of counter 12 corresponds to the number of clock cycles during a time interval of the command execution, during which the clock frequency or clock cycle time is constant, and the value calculated by the multiplier 15 corresponds to the duration of this time interval in suitable time units, e.g., multiples of Tmin. With the time determination circuit shown in FIG. 2, components 12, 14 and 15 therefore allow the duration of a time interval in command execution to be determined, during which the clock cycle time of the processor is held constant.

When the clock frequency or clock cycle time changes, the signal ACCUMULATE assumes the value true, whereupon the adder 16 adds the multiplied value COUNT_VAL×m/n from multiplier 15 to the value RT_COUNT_VAL currently registered in the adder 16, according to the relation:

$$RT\_COUNT\_VAL := RT\_COUNT\_VAL + COUNT\_VAL \times m/n.$$

The same adding function may be performed when the command counter value changes. The adder 16 is configured such that in the latter case, i.e., when the signal RESET_START is true which is coupled to the lower input of adder 16 in FIG. 2, first COUNT_VAL×m/n is added to the value currently registered in the adder, then the value of adder 16 is read out, and only after reading out the adder 16 the value registered in the adder is reset to 0. In this manner, even at the end of the command execution, the value COUNT_VAL×m/n is added by the adder 16 before the value of the adder 16 is read out and reset. The adder 16 thus calculates the sum of the durations of the time intervals in the execution of a command, during which intervals the clock cycle time is constant. Thereby, a cumulative value of the total time elapsed since the start of the command execution is determined. If the time determination circuit 11 is integrated into the circuit 1 of FIG. 1 so as to replace the counter 2 in circuit 1, the output of the adder 16 is connected with an input of comparator 3 so that the execution time of the command provided by the adder 16 can be compared with the threshold value stored in the register 5.

In some embodiments, by integrating the time determination circuit 11 of FIG. 2 into the circuit arrangement 1 of FIG. 1, the circuit arrangement 1 is adapted so that a measure of the execution time of a command is determined that accounts for a variable clock frequency of clock cycle time.

Another illustrative implementation of the time determination circuit 21 is shown in FIG. 3. The time determination circuit 21 has a counter 22 which counts the clock pulses CLK of the processor and in the state combined with the circuit arrangement of FIG. 1 is coupled with the output of the processor signal detector 7 to receive the signal RESET_START. The time determination circuit 21 furthermore has an increment logic circuit 24 which reads the value of the clock frequency or clock cycle time of the processor from a register 23, which may, but does not need to, form part of the time determination circuit and is indicated merely schematically in FIG. 3. The increment logic circuit 24 is coupled with the counter 22 to set an increment of the counter 22 based on the clock frequency or clock cycle time of the processor, the value of the increment being designated INC_VAL in FIG. 3.

For illustrative purposes, it will be assumed for the following explanations that the clock frequency or clock cycle time (period) T of the processor can be written as a multiple of a minimum time period Tmin, i.e., T=m×Tmin, where m is an integer. The increment logic circuit 24, based on the clock frequency value F_VAL, determines an increment value INC_VAL according to INC_VAL=m×INC_MIN, where INC_MIN is a minimum increment, for example 1. The counter 22 adds the respective increment value INC_VAL for each processor clock pulse CLK. When the value of the command counter changes, the counter 22 is reset and restarted by signal RESET_START becoming true. The current value of the counter 22 indicates a measure for the time elapsed since the start of command execution in units of Tmin and is therefore a measure of the execution time. If the circuit 21 is integrated into the circuit arrangement of FIG. 1, the output of counter 22 is connected with the comparator 3 which compares the counter value with the predetermined threshold value.

The implementations of the time determination circuit as described with reference to FIGS. 2 and 3 may be used to determine the execution time of the command and to selectively store, based on the execution time, the data corresponding to the command, such as the indicator indicative of the command.

Even when the clock frequency or clock cycle time of the processor is variable, the number of clock cycles elapsing during command execution can serve as a measure for the execution time. In some embodiments, the circuit arrangement may include a frequency detector to detect a clock frequency or clock cycle time of a processor. The threshold value with which a value indicative of the execution time, e.g. a number of clock cycles, is compared may be selected based on the clock frequency or the clock cycle time from a plurality of different threshold values. In some embodiments, the circuit arrangement may include a threshold value memory coupled to the comparator to store the plurality of different threshold values.

Figure 4:
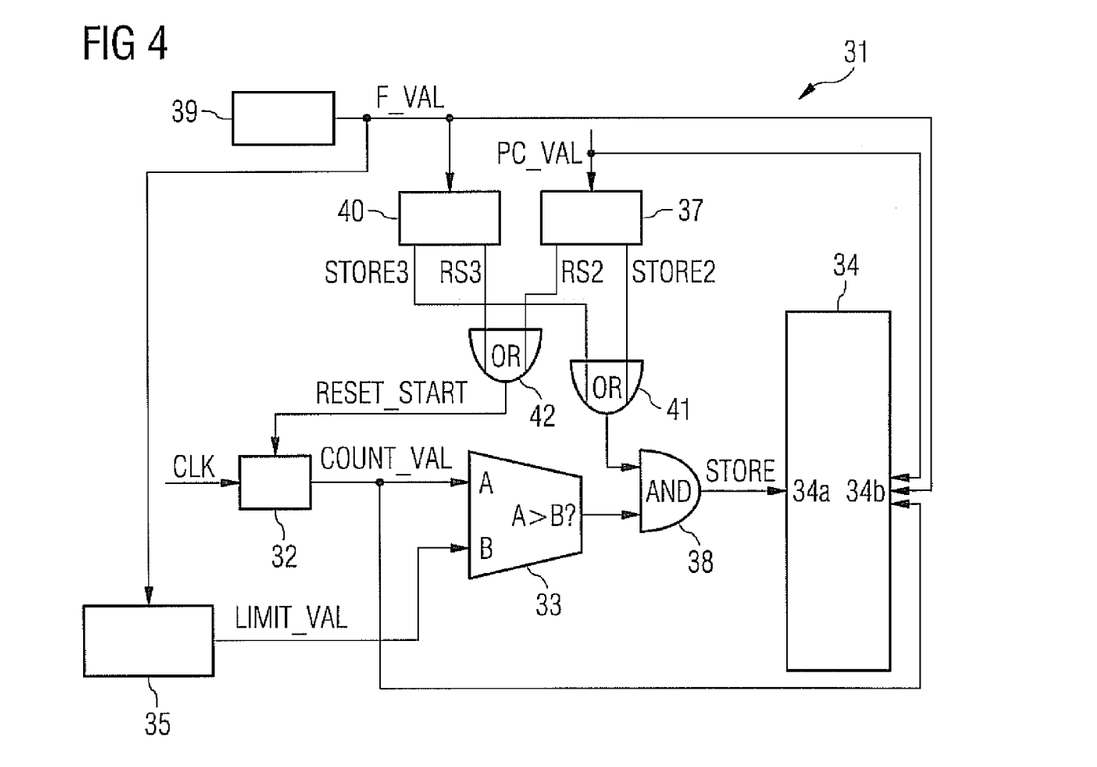
FIG. 4 is a schematic diagram of an illustrative embodiment of a circuit arrangement for determining an execution time of a command.

FIG. 4 shows a circuit arrangement 31 according to one illustrative embodiment. The circuit arrangement 31 includes a counter 32, a comparator 33 and a memory 34, the structure and function of which essentially correspond to those of the corresponding components 2, 3 and 4 in FIG. 1, respectively. The memory 34 is further configured to store, in addition to the value PC_VAL of the command counter and a number of clock cycles COUNT_VAL, the value F_VAL indicative of the clock frequency or clock cycle time of the processor, so that after reading the memory 34, execution times of commands can be calculated from the number of clock cycles and the corresponding clock cycle time. The circuit arrangement furthermore has a processor signal detector 37 and a frequency detector 40, the structure and function of which substantially correspond to those of the processor signal detector 37 of FIG. 1 and the frequency detector 14 of FIG. 2, respectively. The processor signal detector 37 and frequency detector 40 each have two outputs, one of which is respectively coupled to the inputs of an OR gate 41 and the other to the inputs of an OR gate 42. In response to a change in the value PC_VAL of the command counter, the signal value STORE2 at the output of processor signal detector 37 connected with the OR gate 41 is set to the value true, and with a time delay also the signal value RS2 at the output of processor signal detector 37 connected with the OR gate 42 is set to the value true. The frequency detector 40, which may be configured as a change detector, is coupled with a register 39 in which the current clock frequency or clock cycle time of the processor is stored. In response to a detected change in clock frequency, the output of frequency detector 40 coupled with the OR gate 41 with the signal STORE3 is set to the value true, and also, after a time delay, the output of frequency detector 40 connected with the OR gate 42 with signal RS3 is set to the value true.

The output of the OR gate 42 is connected with the counter 32 and provides the signal RESET_START to the counter 32. Thus the counter 32 is reset to 0 and restarted both when a change of value PC_VAL of the command counter occurs and when a change of clock frequency or clock cycle time of the processor occurs. The output of the OR gate 41 is coupled with an input of an AND gate 38, the other input of which is coupled with the output of comparator 33. The output of the AND gate 38 is connected with an input 34a of memory 34 and provides the STORE signal to the input 34a, so that the value of the command counter, the number of clock cycles and the current clock frequency are stored in the memory 34 if the signal STORE assumes the value true. It should be noted that in the illustrative embodiment shown in FIG. 4, the value PC_VAL of the command counter, the value COUNT_VAL of the counter 32, and the current clock frequency or clock cycle time F_VAL, are each stored in the memory 34 if the value of the command counter or the clock frequency changes, assuming that the value of the counter 32, at the time in which the value of the command counter or the clock frequency changes, exceeds the associated threshold value, so that the output of comparator 33 has the value true.

To take into account variations in clock frequency or clock cycle time, in some embodiments, the register 35 does not store a single threshold value but may store a plurality of threshold values which are associated with different possible clock frequencies or clock cycle times of the processor. The plurality of threshold values can for example be stored in the form of a threshold value table associating a plurality of clock frequency or clock cycle time values with a plurality of threshold values. The threshold value register 35 has an input for receiving the value of the clock frequency or clock cycle time F_VAL and is configured to provide, in response to the received value of the clock frequency or clock cycle time, the associated threshold value LIMIT_VAL for the comparator 33 at its output. In some embodiments, the threshold value is suitably selected based on a current clock frequency or clock cycle time so that only when a pre-specified time duration is exceeded in execution of the command the value of the command counter, the value of counter 32 and the current value of clock frequency or clock cycle time are stored in the memory 34. In further embodiments in which the processor is cycled with two different clock cycle times, one of which is twice as long as the other, the threshold values stored in register 35 in one may be selected such that the threshold value associated with the short clock cycle time is twice as large as the threshold value associated with the long clock cycle time.

Illustrative embodiments of a change detector that may be employed as a circuit state detector and/or a frequency detector will be described next. The change detector can be configured such that it includes a register chain with a first register and a second register each for one bit of the monitored signal. The first register and the second register each store a value of the bit at different times, in particular during successive clock cycles of the processor. The values stored in the first and second registers may be compared, for example, by means of an XOR gate so that a change in the circuit state signal can be detected utilizing a bit by bit comparison.

Figure 5:
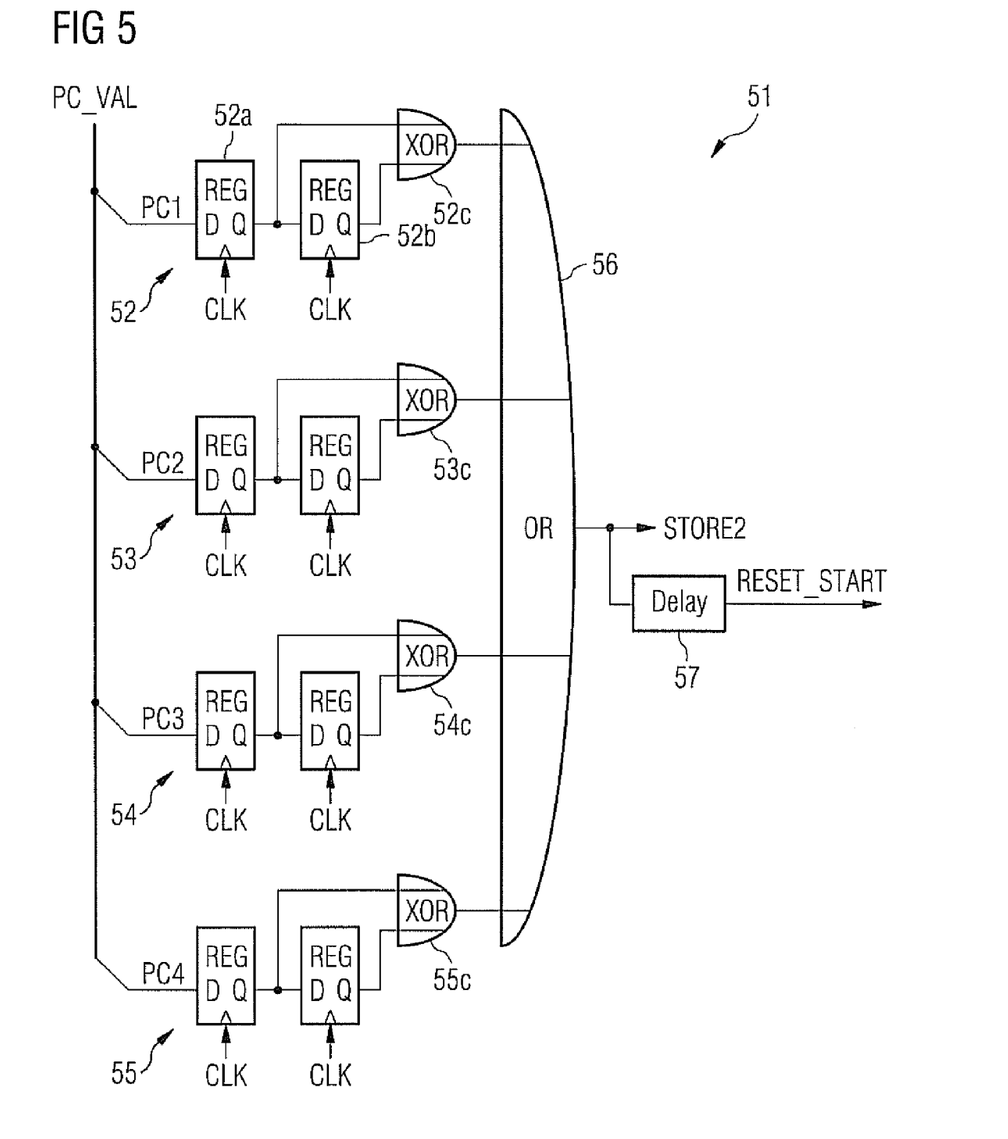
FIG. 5 is a schematic diagram of an illustrative embodiment of a circuit state detector.

Referring to FIG. 5, an illustrative implementation of a change detector is described that may be employed to implement, for example, the process signal detector 7 or 37 in the circuit arrangements of FIG. 1 or FIG. 4, or the frequency detector 13 or 40 in the circuits of FIG. 2 or FIG. 4. For illustrative purposes only, the change detector 51 of FIG. 5 will be explained with reference to the case of a value PC_VAL of the command counter having four bits PC1-PC4. In this illustrative embodiment, a change in the value of the command counter is monitored in that the change of values of the individual bits of the signal is monitored bit by bit utilizing circuits 52-55. Circuits 52-55 may be structured in a the same manner or a substantially similar manner so that only circuit 52 for the first bit PC1 will be explained in more detail as an example.

The circuit 52 has a two-stage register chain including a first register 52a and a second register 52b, wherein the actual value of the first bit PC1 is cycled into the first register 52a. Thus, the second register 52b has stored therein the value which the bit assumed during the clock cycle preceding the current clock cycle. The outputs of the first register 52a and second register 52b are coupled with the inputs of an XOR gate 52c, which forms a comparator circuit to compare the values of the first and second registers 52a, 52b. The output of the XOR gate 52c assumes the value true if the values stored in the first register 52a and the second register 52b for the first bit are different, i.e. if the value of the bit has changed between the preceding clock cycle and the current clock cycle. Similarly, the outputs of the XOR gates 53c-55c of circuits 53-55 are true if the value of the corresponding bit has changed between the preceding clock cycle and the current clock cycle.

The outputs of the XOR gates 52c-55c are coupled with the inputs of an OR gate 56 so that the output of the OR gate 56 assumes the value true if the value of any one bit of the command counter value has changed between the preceding and the current clock cycle. In some embodiments, the output signal of the OR gate 56, in the case where the change detector is used as a processor signal detector 7 or 37, can be used to provide the signal STORE2. To form the signal RESET_START, the output of the OR gate 56 may be passed via a delay stage 57. The delay stage 57 allows the desired values, e.g. the value of the command counter value or the number of clock cycles, to be stored in the memory 4 or 34 of the circuit arrangement of FIG. 1 or FIG. 4, since the signal STORE2 assumes the value true before the value of counter 2 or 32 is reset to 0 and the counter restarted, which is initiated by the signal RESET_START assuming the value true. In some embodiments, the delay stage 57 does not need be provided, i.e., the signal RESET_START can be equal to the signal STORE2 if the required values, such as for example the value of counter 2 or 32, can be stored in the memory 34 before the counter 2 or 32 is reset to 0.

The circuit arrangements for determining an execution time of a command may be formed as an integral part of an integrated circuit. Accordingly, in some embodiments, an integrated circuit is provided which has a processor and a circuit arrangement to determine an execution time of a command. The processor can include a command counter, wherein the circuit arrangement includes a circuit state detector which is coupled with the command counter to monitor a value of the command counter and which is configured to output a signal indicating a start and/or end of execution of the command to a time determination circuit of the circuit arrangement if a change in the command counter value is detected. In some embodiments, the circuit arrangement for determining an execution time of a command included by the integrated circuit may be configured as shown in FIG. 1 or 4.

In addition, a method of determining an execution time of a command is provided. In some embodiments, the method may be performed utilizing a circuit arrangement for determining an execution time according to any one embodiment. The method may include determining a value indicative of the execution time, comparing the value indicative of the execution time with a threshold value and storing an indicator indicative of the command based on a result of the comparing.

In some embodiments, determining the value indicative of the execution time can include receiving a signal indicative of the start and/or end of execution of the command. The signal indicative of the start and/or end of the execution can be selected from the group including a change of a command counter value, a cache miss signal, a stall signal and a signal indicating memory access in the processor. Both the signal indicative of the start of the execution of the command and the signal indicative of the end of the execution of the command may correspond to a change in the command counter value. In further embodiments, the signal indicative of the start of the execution of the command is a change in a cache miss signal, while the signal indicative of the end of the execution of the command is a change in a signal indicating that a memory access is being performed. The monitored circuit state signals may be selected based on whether the execution time is to be determined for all commands or for particular classes of commands.

In some embodiments, determining the value indicative of the execution time can include determining a number of clock cycles during the execution of the command. The value indicative of the execution time may include the execution time of the command. Then, determining the value indicative of the execution time can include determining a clock cycle time of the processor and multiplying the clock cycle time with the number of clock cycles. The determining the value indicative of the execution time may further include summing products of clock cycle numbers and clock cycles times established for time intervals in which the clock cycle time is constant, to thereby derive an accumulated execution time.

In some embodiments, the value indicative of the execution time can include the number of clock cycles. The threshold value with which the number of clock cycles is compared may be selected based on the clock frequency or clock cycle time of the processor.

The indicator indicative of the command can be a command counter value of the processor, or any other suitable indicator for a command in a command sequence.

In some embodiments, the method may be performed as an on-chip debug method. The method can include reading the indicator indicative of the command from a memory in order to utilize it for further analysis, which for example allows the possible violations of real-time conditions to be detected.

While illustrative embodiments have been described above, it is to be understood that various modifications and alterations of the circuits and methods described above may be implemented in other embodiments. For example, with the circuit arrangements 1 and 31 shown in FIGS. 1 and 4, respectively, the value PC_VAL of the command counter of the processor may be monitored, a change in the value of the command counter indicating the start of the execution of a new command. Further, other signals, e.g. a stall signal of the processor, a cache miss signal of the processor or a signal indicating an end of a memory access of the processor, may be monitored. In the illustrative embodiments of FIG. 1 and FIG. 4, the command counter value is stored in the memory 4 or 34 as an indicator of the command of which the execution time has been determined. However, any other suitable value indicative of a command can be stored instead of or in addition to the command counter value. Further, while some illustrative embodiments have been described above with reference to software debugging, embodiments as described herein may be used in any other application or context in which execution times of commands in a sequence of commands are to be determined.

What is claimed is:

1. An apparatus, comprising:
a time determination circuit configured to determine, for each of a plurality of commands executed by a processor, a value indicative of an execution time of the command;
a comparator coupled with the time determination circuit and configured to compare, for each of the commands, the value determined for the command with a threshold value;
a storage circuit coupled with the comparator and configured to select a first subset of the plurality of commands depending upon an outcome of the comparison of the values and the threshold value, and to store data representing the first subset of the commands but not a second subset of the commands; and
a frequency detector configured to detect a frequency of a clock of the processor or a cycle time of the clock of the processor,
wherein the apparatus is configured to select the threshold value from a plurality of threshold values based on the clock frequency or the clock cycle time, the plurality of threshold values being associated with a plurality of frequencies or a plurality of cycle times.

2. The apparatus of claim 1, wherein the storage circuit is further configured to store the values indicative of the execution times of each of the first subset of commands.

3. The apparatus of claim 1, further comprising a circuit state detector configured to provide an output signal indicative of at least one of a start and an end of an execution of each command to the time determination circuit.

4. The apparatus of claim 3, wherein circuit state detector is further configured to receive an input signal consisting of one of a command counter value, a cache miss signal, a stall signal, and a signal indicative of a memory access, and to generate the output signal depending upon the input signal.

5. An apparatus, comprising:
a time determination circuit comprising a counter configured to count clock cycles of a processor and to determine a value indicative of an execution time of a command based on a number of the clock cycles occurring during execution of the command by the processor, the command being part of a sequence of commands;
a comparator coupled with the time determination circuit and configured to compare the value determined for the command with a threshold value; and
a storage circuit coupled with the comparator and configured either to store an indicator indicative of the command responsive to the value exceeding the threshold value or to store the indicator indicative of the command responsive to the value being equal to or greater than the threshold value, and further configured to not store the indicator responsive to the value being less than the threshold value, wherein the stored indicator includes information identifying the command in the sequence of commands,
wherein the time determination circuit is configured to set an increment of the counter based on the clock frequency or clock cycle time.

6. The apparatus of claim 5, wherein the time determination circuit is configured to determine at least one of a clock frequency and a clock cycle time of the processor and to determine the execution time based on the number of the clock cycles and further based on one of the clock frequency and the clock cycle time.

7. The apparatus of claim 6, wherein the time determination circuit comprises a multiplier configured to calculate a product of the clock cycle time and the number of clock cycles.

8. The apparatus of claim 7, wherein the time determination circuit comprises an adder coupled with the multiplier and configured to calculate a cumulative execution time by adding the product responsive to a change in a frequency of the clock or a change in a cycle time of the clock.

9. The apparatus of claim 5, wherein the storage circuit is configured to store the clock frequency or clock cycle time if the value indicative of the execution time exceeds the threshold value.

10. The apparatus of claim 5, wherein the indicator indicative of the command comprises a command counter value of the processor.

11. The apparatus of claim 5, wherein the time determination circuit is further configured to increment the counter by said set increment.

12. An apparatus, comprising:
a time determination circuit comprising a counter configured to count clock cycles of a processor and to determine a value indicative of an execution time of a command based on a number of the clock cycles occurring during execution of the command by the processor, the command being part of a sequence of commands;
a comparator coupled with the time determination circuit and configured to compare the value determined for the command with a threshold value;
a storage circuit coupled with the comparator and configured either to store an indicator indicative of the command responsive to the value exceeding the threshold value or to store the indicator indicative of the command responsive to the value being equal to or greater than the threshold value, and further configured to not store the indicator responsive to the value being less than the threshold value, wherein the stored indicator includes information identifying the command in the sequence of commands; and
further comprising a frequency detector configured to detect a frequency of the clock or a cycle time of the clock, wherein the apparatus is configured to select the threshold value from a plurality of threshold values based on the clock frequency or clock cycle time.

13. The apparatus of claim 12, comprising a threshold value memory coupled with the comparator to store the plurality of values for the threshold value.

14. The apparatus of claim 12, wherein the frequency detector is further configured to detect a change in the clock frequency or the clock cycle time, and the storage circuit is coupled with the frequency detector and further configured to store the clock frequency or the clock cycle time responsive to the frequency detector detecting a change in the clock frequency or clock cycle time.

15. An integrated circuit, comprising:
a processor; and
a circuit arrangement coupled to said processor, the circuit arrangement comprising:
    a time determination circuit configured to determine, for each of a plurality of commands executed by the processor, a value indicative of an execution time of the command,
    a comparator coupled with the time determination circuit and configured to compare, for each of the commands, the value determined for the command with a threshold value,
    a storage circuit coupled with the comparator and configured to select a first subset of the plurality of commands depending upon an outcome of the comparison of the values and the threshold value, and to store data representing the first subset of the commands but not a second subset of the commands; and
    a frequency detector configured to detect a frequency of a clock of the processor or a cycle time of the clock of the processor,
wherein the circuit arrangement is configured to select the threshold value from a plurality of threshold values based on the detected clock frequency or the detected clock cycle time, the plurality of threshold values being associated with a plurality of frequencies or a plurality of cycle times.

16. The integrated circuit according to claim 15, wherein the processor comprises a command counter and the circuit arrangement further comprises a circuit state detector coupled with the command counter and configured to monitor a value of the command counter and to provide a signal indicative of at least one of a start and an end of the execution of the command to the time determination circuit responsive to detecting a change in the command counter value.

17. The integrated circuit according to claim 15, wherein the integrated circuit further comprises a debug interface configured to read out data stored in the storage circuit to a location outside the integrated circuit.

18. A method, comprising:
determining a value indicative of an execution time of a command by a processor, the command being part of a sequence of commands;
detecting a frequency of a clock of the processor or a cycle time of the clock of the processor;
comparing the value indicative of the execution time of the command with a threshold value; and
either storing or not storing an indicator indicative of the command, depending upon on a result of the comparing, wherein the stored indicator includes information identifying the command in the sequence of commands,
wherein said determining the value indicative of the execution time comprises adjusting an increment of a counter as a function of the detected frequency or as a function of the detected cycle time.

19. The method of claim 18, further comprising storing the indicator indicative of the command responsive to the execution time exceeding the threshold value.

20. The method of claim 18, wherein the indicator indicative of the command comprises a command counter value of the processor.

21. The method of claim 18, further comprising reading out the value indicative of the execution time and the indicator indicative of the command.

22. The method of claim 18, further comprising incrementing the counter by said adjusted increment.

23. A method, comprising:
determining a number of clock cycles during an execution of a command by a processor;
determining at least one of a clock frequency and a clock cycle time of the processor;
determining a value based on the number of clock cycles;
determining whether to store an indicator indicative of the command, based on whether the value exceeds a threshold value, wherein the threshold value is selected from a plurality of threshold values based on the at least one of the clock frequency and the clock cycle time, the plurality of threshold values being respectively associated with a plurality of frequencies or with a plurality of cycle times of a clock of the processor; and
if it is determined to store the indicator, then storing the indicator.

24. The method of claim 23, wherein the value comprises an execution time of the command and determining the value comprises multiplying the clock cycle time with the number of clock cycles.

25. The method of claim 24, wherein the clock cycle time is variable and determining the value comprises:
determining a number of the clock cycles occurring during a time interval in which the clock cycle time is constant;
multiplying the number of clock cycles occurring during the time interval with the clock cycle time; and
summing products of the number of clock cycles occurring during the time interval and the clock cycle time.

26. The method of claim 25, further comprising:
determining the threshold value based on at least one of the clock frequency and clock cycle time.

* * * * *